United States Patent [19]

Poisel et al.

[11] Patent Number: 5,025,148
[45] Date of Patent: Jun. 18, 1991

[54] LASER WARNING SENSOR WITH FREQUENCY-CODED POSITION INFORMATION

[75] Inventors: Hans Poisel, Dachau; Gert Trommer, Munich, both of Fed. Rep. of Germany

[73] Assignee: Messerschmitt-Boelkow-Blohm GmbH, Munich, Fed. Rep. of Germany

[21] Appl. No.: 416,911

[22] Filed: Oct. 4, 1989

[30] Foreign Application Priority Data

Oct. 4, 1988 [DE] Fed. Rep. of Germany ....... 3833634

[51] Int. Cl.⁵ .................................................. H01J 5/16
[52] U.S. Cl. ............................ 250/227.12; 250/206.1; 356/152
[58] Field of Search ............. 250/227.12, 206.1, 206.2; 356/141, 152

[56] References Cited

U.S. PATENT DOCUMENTS 3,991,318 11/1976 Duguay .......................... 250/227.12
4,558,920 12/1985 Newton et al. ................. 250/227.12
4,825,063 4/1989 Haldorsson et al. ................. 356/152

*Primary Examiner*—David C. Nelms
*Attorney, Agent, or Firm*—W. G. Fasse; D. H. Kane, Jr.

[57] ABSTRACT

A laser warning sensor having a directional resolution capability based on a pulse frequency encoding of the directions at which laser light beams are received, is equipped with a plurality of light signal delay units. The directional or angular information is encoded by closed loop fiberglass light conductors, one of which is part of each light signal delay unit, each closed loop has a different length so that the respective signal delay signifies the respective directional information. The closed loop light conductors transform received light pulse signals into pulse sequences or pulse trains each having a given frequency. The respective frequencies are separated by filters in an electronic evaluating circuit which receives its input signals from a photodiode which receives the output light signals from all delay units.

7 Claims, 1 Drawing Sheet

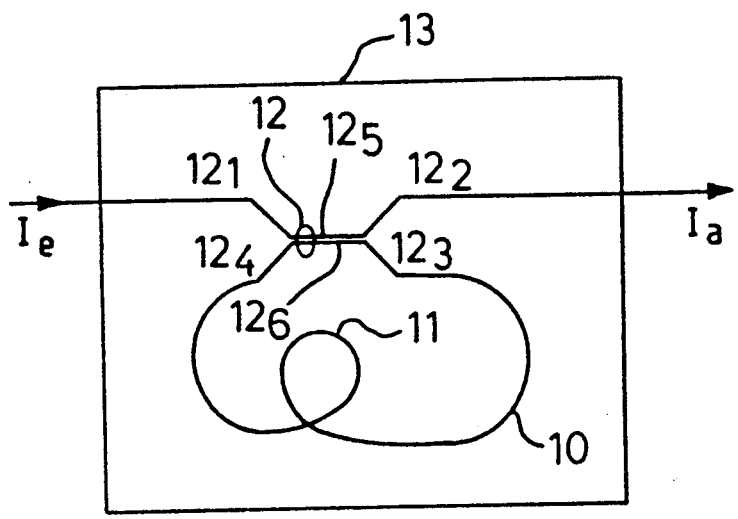
FIG.1
FIG. 2A
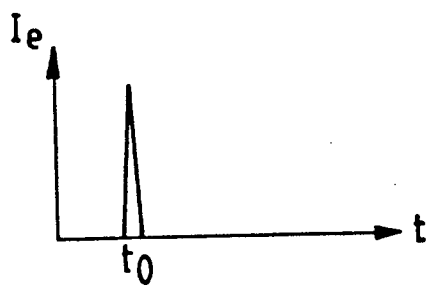
FIG. 2B
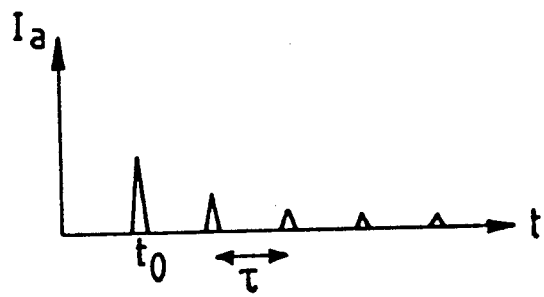
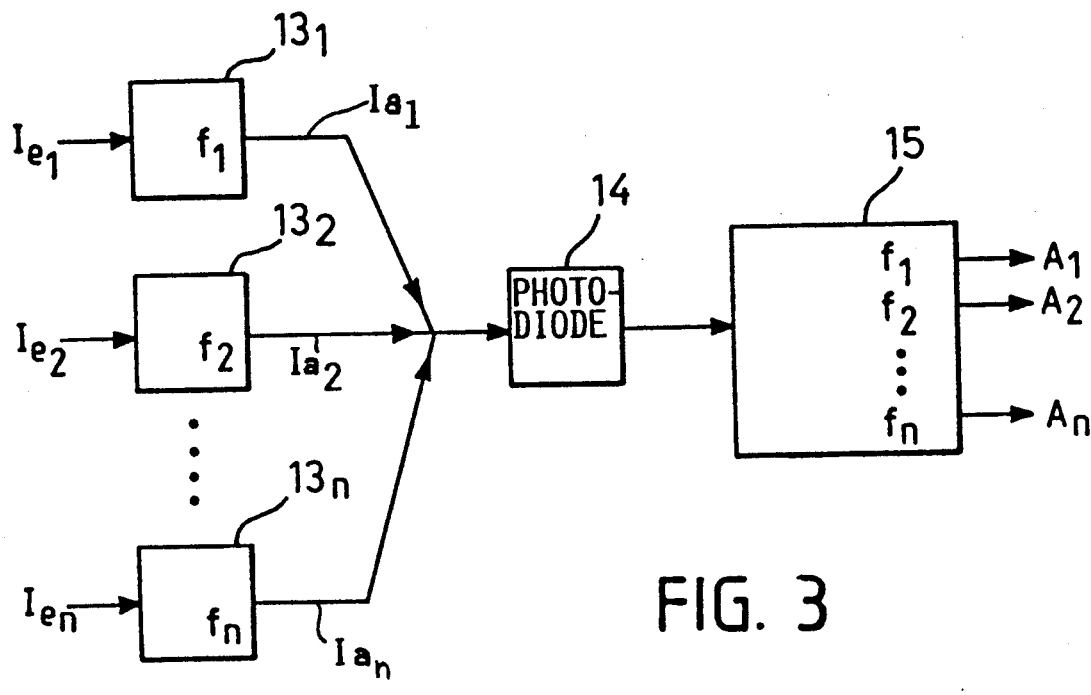
FIG. 3

LASER WARNING SENSOR WITH FREQUENCY-CODED POSITION INFORMATION

FIELD OF THE INVENTION

The invention relates to a laser warning sensor having directional resolution capabilities. Angular information representing azimuth and elevational sequences are distinguished by means of glass fiber signal delay conductors which have different lengths for causing different delays resulting in defined propagation time differences between a start and a stop to provide the required encoding.

BACKGROUND INFORMATION

German Patent (DE-PS) 3,525,518 describes a laser sensor of the type mentioned above. Such sensors convert the angular information of azimuth and elevational sequences into defined propagation time differences by means of glass filer delay conductors, each having a different length to provide an encoding which signifies the directional information. The delay time is counted between a start and a stop.

It has been found that a precise detection of the angular information requires a high precision in the electronic components which must measure the propagation time. In order to assure such high precision, it is conventionally necessary to provide relatively large propagation time differences between the various stop conductors so that respectively long light conductor fibers are required. Such long light conductor fibers must be wound up in respective coils which may become quite voluminous.

OBJECTS OF THE INVENTION

In view of the foregoing, it is the aim of the invention to achieve the following objects singly or in combination:

to improve a laser warning sensor of the type mentioned above in such a way that the need for very long delay light conductor fibers is eliminated or at least minimized;

to simplify the electronic evaluating unit while still maintaining the required precision; and to make sure that light signals emanating from other sources rather than from the laser source to be sensed or detected, such as sun beams, lightnings, detonation caused light phenomena and the like are clearly distinguished from the signals to be detected.

SUMMARY OF THE INVENTION

The laser warning sensor according to the invention is characterized by a combination of a plurality of feedback units, wherein each feedback unit comprises a glass fiber conductor constructed as a time delay conductor which forms a closed loop, the ends of which are connected to coupling arms which in turn are connected to a coupling element that cooperates with a further coupling element of the respective feedback unit.

BRIEF DESCRIPTION OF THE DRAWINGS

In order that the invention may be clearly understood, it will now be described, by way of example, with reference to the accompanying drawings, wherein:

FIG. 1 illustrates schematically one of the plurality of feedback units with its closed loop delay circuit according to the invention;

FIG. 2A illustrates a directional light input signal at the input of the delay unit of FIG. 1;

FIG. 2B illustrates a pulse train at the output of the delay unit; and

FIG. 3 is a block diagram of the laser warning sensor or detector according to the invention.

DETAILED DESCRIPTION OF PREFERRED EXAMPLE EMBODIMENTS AND OF THE BEST MODE OF THE INVENTION

Referring first to FIG. 3, the laser sensor or detector according to the invention comprises a plurality of signal delay units $13_1$, $13_2$, ..., $13_n$. Each delay unit has its own signal input $I_{e1}$, $I_{e2}$, ..., $I_{en}$. These inputs are represented by arrows which in turn represent conventional optical receivers for receiving a laser light. Each delay unit operates at its own frequency $f_1$, $f_2$, ..., $f_n$. Each delay unit has its own output $I_{a1}$, $I_{a2}$, ..., $I_{an}$. The light signal outputs of each delay unit are directed onto a common photo-diode 14 which converts the received light signals into respective electrical signals appearing at the output of the photo-diode 14 which is connected to an electronic evaluating circuit 15. The circuit 15 includes a separate frequency pass filter for the frequencies $f_1$, $f_2$, ..., $f_n$ to provide respective signals $A_1$, $A_2$, ..., $A_n$ at the outputs of the signal evaluating electronic circuit 15. Incidentally, each of the optical input elements $I_{e1}$, $I_{e2}$, ..., $I_{en}$ is arranged at a given fixed angle with regard to azimuth and elevation. Such fixed angle values are stored in the evaluating circuit 15 for the required signal correlation.

Referring to FIG. 1, each delay unit 13 comprises the respective optical input $I_e$ and an optical output $I_a$. Additionally, each unit 13 comprises a delay conductor 10 in the form of a glass fiber light conductor forming a closed light signal delay loop 11 cooperating with coupling means 12. The coupling means 12 comprise in the input output conductor an input arm or element $12_1$, an output arm $12_2$, and a first coupling element $12_5$ interconnecting the input arm with the output arm. Thus, the optical input is connected to the optical output by the just mentioned elements $12_1$, $12_5$, $12_2$. The coupling means 12 further comprise a first delay arm or element $12_3$, a second delay arm or element $12_4$, and a second coupling element $12_6$ interconnecting the first and second delay arms $12_3$ and $12_4$ to each other and further connecting the light conductor delay loop 11 to the second coupling element $12_6$ to form the closed loop 11. The coupling elements $12_5$ and $12_6$ are arranged next to each other for a light coupling interaction.

The delay or feedback unit 13 of FIG. 1 works as follows. A small proportion of the light coupled into the arm $12_1$ leaves the coupling unit through the coupling element $12_5$ and through the arm $12_2$ to the output $I_a$. The larger proportion is coupled into the coupling arm 123 and passes through the delay loop 11 to the coupling arm $12_4$. Thus, the light proportion passing into the delay loop 11 is reduced by the relatively small proportion that leaves directly through the output $I_a$. Thus, always the larger proportion of the light signal passes through the delay loop 11.

If a laser impulse of short duration is received by the optical input member $I_e$ a respective light impulse is coupled into the corresponding delay unit 13 representing the corresponding azimuth or elevation sequence.

Due to the light feedback by means of the above described glass fiber closed loop 11, the output signal Ia becomes a pulse sequence with diminishing amplitudes as shown in FIG. 2B. The input signal is shown in FIG. 2A. The attenuating pulse sequence or pulse train shown in FIG. 2B has a frequency $$f = \frac{1}{t} = \frac{c}{(nL)}$$

wherein t corresponds to the delay time in the closed loop 11, wherein c is the speed of light in vacuum, wherein n is the refractory index of the glass fiber core, and wherein L is the length of the closed loop 11. By respectively selecting the fiber length L it is thus possible to select a respective pulse frequency for the attenuating pulse train shown in FIG. 2B.

The output signals $I_{a1}$, $I_{a2}$, $I_{an}$ are selectively detected in the evaluating circuit 15. Such frequency selective circuits are conventionally constructed by LC- or active RC-oscillating circuits.

From the foregoing description including the description of FIG. 3 it will be appreciated that each of the delay units $13_1$, $13_2$, ..., $13_n$ is tuned to a fixed separate frequency $f_1$, $f_2$, $f_n$. For example, if the fiber length is 5 m, the respective frequency would be about 40 MHz.

The requirements that must be met by the coupling means 12 are expressed as follows by the respective power matrix P:

$$\begin{pmatrix} I_{a22} \\ I_{a23} \end{pmatrix} = Px \begin{pmatrix} I_{e21} \\ I_{e24} \end{pmatrix}$$

wherein P should have the form $$P = \begin{pmatrix} d & d \\ 1-d & 1-d \end{pmatrix}.$$

The order of magnitude for d is within the range of a few percentage points in the present instance in order not to dampen or attenuate the output pulse train too much. For this purpose it is suggested that the feedback elements are constructed as multi-mode elements whereby the cross-section of the coupling element $12_5$ which interconnect the coupling arms $12_1$ and $12_2$ has a cross-sectional surface area corresponding only to a few percentage points of the cross-sectional area of the coupling element $12_6$ which interconnects the coupling arms $12_3$ and $12_4$.

Feedback units constructed for mono-mode operation, in other words having but one feedback path, are known. Such circuits make use of a constructive or destructive interference in the coupling means, whereby phase changes of the feedback coil are measured for sensing purposes. However, the invention uses multi-mode feedback paths. In this manner undesirable interference effects are avoided.

It is further known to use feedback units as selective filters, whereby pulse trains are applied to the input and feedback unit supplies a large output signal only if the pulse train frequency at the input equals the eigen-frequency of feedback unit. Contrary to the just described conventional use of feedback units, according to the invention, a plurality of feedback units 13 are connected or combined as shown in FIG. 3 with a frequency analysis in the electronic evaluating circuit 15, whereby each feedback unit is triggered to oscillate in its eigenfrequency by the appearance of a single pulse at the respective input $I_e$.

According to a further embodiment of the invention, the present sensor shall distinguish laser pulses from pulses emanating from other light sources as sun beams, lightnings, detonation light phenomena and so forth. The distinction is possible due to the known differences in the rising flank of the respective pulses. Only those pulse sequences or pulse trains emanate from a pulsed or pulse type laser source which have individual pulses with very short rise times typically less than 50 ns. Pulses from other light sources have longer rise times. This fact is discriminated according to the invention by means of a respectively tuned high pass filter in the circuit 15. Such high pass filter passes only those frequency components which have rise times shorter than a threshold rise time of, for example, 50 ns. Accordingly, only those input pulses will be accepted as laser pulses producing an output signal at the output of the respective high pass filter.

Although the invention has been described with reference to specific example embodiments, it will be appreciated that it is intended to cover all modifications and equivalents within the scope of the appended claims.

What is claimed is:

1. A laser warning sensor having a directional resolution capability, comprising a plurality of laser light conductor feedback units ($13_1$ to $13_n$), each feedback unit including an optical input element, an optical output element, and a signal delay glass fiber light conductor having a defined length differing from lengths of other signal delay light conductors of other feedback units, so that each feedback unit is tuned to a fixed separate frequency, each optical input element providing a different azimuth and elevation input information to its feedback unit, each of said plurality of feedback units ($13_1$ to $13_n$) further comprising coupling means for coupling each of said signal delay glass fiber light conductors to its respective feedback unit for forming a signal delay light conductor closed loop (11), one end of which is coupled to said optical input element while another closed loop end is coupled to said optical output element, each closed loop producing at said optical output element a separate pulse train based on said separate frequency for identifying said different azimuth and elevation input information to provide said resolution capability.

2. The laser warning sensor of claim 1, wherein each of said coupling means comprises two coupling arms ($12_3$, $12_4$) to which ends of the respective signal delay light conductor closed loop (11) are connected.

3. The laser warning sensor of claim 1, wherein said feedback units are multi-made feedback elements.

4. The laser warning sensor of claim 1, wherein said optical input element and said optical output element form an input-output section including an input arm ($12_1$) and an output arm ($12_2$), said coupling means comprising a first coupling element ($12_5$) interconnecting said input arm with said output arm, said signal delay glass fiber light conductor including a first delay arm ($12_3$) and a second delay arm ($12_4$), said coupling means comprising a second coupling element ($12_6$) interconnecting said first and second delay arms to each other, said signal delay light conductor closed loop (11) being connected to said second coupling element ($12_6$) through said first and second delay arms ($12_3$, $12_4$), said first coupling element ($12_5$) and said second coupling element ($12_6$) being arranged next to each other for an optical coupling interaction.

5. The laser warning sensor of claim 1, further comprising a photodiode (14) connected to receive at its input, output signals of all of said feedback units ($13_1$ to $13_n$), and electronic signal evaluating means (15) connected to an output of said photo-diode for evaluating received laser signals in accordance with said separate frequencies.

6. The laser warning sensor of claim 5, wherein said electronic signal evaluating means comprise electronic high pass filter means tuned to said separate frequencies for separating light signals other than laser signals, from said laser signals.

7. The laser warning sensor of claim 4, wherein said first coupling element ($12_5$) has a light conductor cross-sectional area which is smaller than a respective light conductor cross-sectional area of said second coupling element ($12_6$) for providing a lower coupling into output arm ($12_2$) than into said first delay arm ($12_3$).

* * * * *

UNITED STATES PATENT AND TRADEMARK OFFICE
CERTIFICATE OF CORRECTION

PATENT NO. : 5,025,148
DATED      : June 18, 1991
INVENTOR(S) : Hans Poisel; Gert Trommer It is certified that error appears in the above-identified patent and that said Letters Patent is hereby corrected as shown below:

Claim 3, column 4, line 57, replace "multi-made" by --multi-mode--.

Signed and Sealed this

Sixth Day of October, 1992

Attest:

DOUGLAS B. COMER

Attesting Officer

Acting Commissioner of Patents and Trademarks